(12) United States Patent
Krause et al.

(10) Patent No.: US 8,890,379 B2
(45) Date of Patent: Nov. 18, 2014

(54) ROTATING RECTIFIER ASSEMBLY AND METHOD

(71) Applicant: Hamilton Sundstrand Corporation, Windsor Locks, CT (US)

(72) Inventors: Joseph Paul Krause, Downers Grove, IL (US); Dhaval Patel, Loves Park, IL (US); Glenn C. Lemmers, Loves Park, IL (US); Mark J. Franklin, Janesville, WI (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 14/042,044

(22) Filed: Sep. 30, 2013

(65) Prior Publication Data

US 2014/0239778 A1    Aug. 28, 2014

Related U.S. Application Data

(63) Continuation-in-part of application No. 13/774,977, filed on Feb. 22, 2013.

(51) Int. Cl.
| | |
|---|---|
| *H02K 11/00* | (2006.01) |
| *H02K 15/00* | (2006.01) |
| *H02K 11/04* | (2006.01) |

(52) U.S. Cl.
CPC .............. *H02K 11/042* (2013.01); *H02K 15/00* (2013.01)

USPC ......... 310/68 D; 363/107; 363/108; 363/126; 29/592.1; 29/868

(58) Field of Classification Search
USPC ......... 363/107, 108, 126, 141, 145; 29/592.1, 29/610.1, 825, 832, 729, 739, 868, 874, 29/876, 877, 881, 25.02, 596, 598; 310/68 D
See application file for complete search history.

(56) References Cited

U.S. PATENT DOCUMENTS

| | | | |
|---|---|---|---|
| 4,918,343 | A | 4/1990 | Heinrich et al. |
| 4,959,707 | A | 9/1990 | Pinchott |
| 4,987,328 | A | 1/1991 | Shahamat |
| 5,587,616 | A | 12/1996 | Johnsen |
| 2010/0054005 | A1* | 3/2010 | Grosskopf et al. ............ 363/126 |

* cited by examiner

*Primary Examiner* — Gary L Laxton
*Assistant Examiner* — Afework Demisse
(74) *Attorney, Agent, or Firm* — Kinney & Lange, P.A.

(57) ABSTRACT

A rectifier assembly and method are provided. The rectifier assembly includes a cover comprising a flange having an annular channel extending around an outer circumference of the flange, an annular bus bar, an insulator ring, and an outer housing for receiving the insulator ring, the annular bus bar and the outer housing. A snap ring is positioned within the annular channel of the outer circumference of the flange, wherein an outer circumference of the snap ring is located within a snap ring retention channel located around an inner diameter of the outer housing to retain the cover, the annular bus bar, and the insulator ring within the outer housing.

13 Claims, 12 Drawing Sheets

ROTATING RECTIFIER ASSEMBLY AND METHOD

CROSS-REFERENCE TO RELATED APPLICATIONS

The present application is a continuation-in-part of U.S. patent application Ser. No. 13/774,977, entitled ROTATING RECTIFIER ASSEMBLY AND METHOD", filed Feb. 22, 2013 by Joseph Paul Krause, Dhaval Patel, Glenn C. Lemmers, Jr., and Mark J. Franklin.

TECHNICAL FIELD

The present disclosure relates generally to rotating rectifier assemblies.

BACKGROUND

Rectifiers are generally employed to convert AC voltage to DC voltage. For example, rectifiers may be used in conjunction with AC generators to convert and condition power so that it can be stored in a battery. One specific type of rectifier is a rotating rectifier assembly. Rotating rectifier assemblies are used in brushless wound field synchronous generators.

Brushless wound field synchronous generators include a main machine and a brushless excitation system. The main machine produces the output power of the generator and includes a main armature (stator) and a main field (rotor). The main armature includes a three phase winding. The main field includes a DC field winding which requires excitation voltage to create an electromagnet such that there are north-south pole pairs on the rotor. The main field rotates on the shaft, such that when DC voltage is sourced to it, an AC voltage is induced in the three phase winding included on the main armature. The induced AC voltage in the three phase winding is utilized for output power.

The brushless excitation system includes an exciter field (stator) and an exciter armature (rotor) and a rotating rectifier. The exciter field, similar to the main field, includes a winding that uses voltage to create an electromagnet. The exciter armature, similar to the main armature, includes a three phase AC winding. The exciter armature rotates on the shaft, such that when the exciter field is excited with DC voltage, an AC voltage is induced in the exciter armature. The rotating rectifier converts the AC voltage from the exciter armature to DC voltage. The DC voltage output from the rotating rectifier is applied to the main field. Such rectifiers are designed to rotate on the shaft with the exciter armature and the main field.

Rectifiers include a combination of diodes and a snubber circuit, which are electrically connected via bus bars and between an AC bus and a DC bus, so as to form a suitable rectifier circuit. The snubber circuit can include any series or parallel combination of resistors, capacitors and/or inductors to condition the voltage and current waveforms of the rectifier. The diodes, snubber circuit, and bus bars are typically embedded in recesses formed in an annular insulator ring. The insulator ring serves to electrically insulate the components, while providing structural support so as to maintain the position thereof. The bus bars, resistors, diodes, etc. are then fastened into place on the insulator ring. For example, the bus bars are fastened by screws on either end, with the screws also each fastening to a conductive spring. The springs, in turn, hold the diodes and resistors in place, while providing electrical connection with the bus bar. Each screw is threaded in from the inside diameter of the insulator ring outwards (i.e., "side inserted") into tapped holes formed in the insulator ring.

SUMMARY

Embodiments of the disclosure may provide a rectifier assembly. The rectifier assembly includes a cover comprising a flange having an annular channel extending around an outer circumference of the flange. The rectifier assembly further includes an annular bus bar including an electrically conductive material, and an insulator ring receiving the annular bus bar. The insulator ring defines radially-extending resistor pockets and diode pockets therein. The rectifier assembly also includes resistors disposed in the resistor pockets and electrically connected with the annular bus bar, and diodes disposed in the diode pockets and electrically connected with the annular bus bar. The rectifier assembly also includes an outer housing receiving the annular bus bar and the insulator ring, such that the insulator ring is positioned radially between the annular bus bar and the outer housing. In addition, the rectifier assembly includes a snap ring that is positioned within the annular channel on the outer circumference of the flange. An outer circumference of the snap ring is located within a snap ring retention channel located around an inner diameter of the outer housing.

Embodiments of the present disclosure may also provide a method of manufacturing a rotating rectifier. The method includes inserting diodes and resistors radially inward into pockets extending at least partially radially through an insulator ring, and receiving the insulator ring with the diodes and resistors inserted therein into an outer housing, wherein the outer housing includes a snap ring retention channel located around an inner circumference of the outer housing. The method also includes receiving a monolithic annular bus bar comprising electrically conductive material into the insulator ring such that the insulator ring is radially intermediate the annular bus bar and the outer housing. The method further includes receiving a cover having a flange portion and a cylindrical portion into the monolithic annular bus bar, wherein the flange portion includes an annular channel that extends around an outer circumference of the flange. In addition, the method includes receiving a snap ring into the annular channel of the cover, wherein an outer circumference of the snap ring is located within the snap ring retention channel on the outer housing to retain the cover, the annular bus bar, and the insulator ring within the outer housing.

BRIEF DESCRIPTION OF THE DRAWINGS

The accompanying drawings, which are incorporated in and constitute a part of this specification, illustrate aspects of the present teachings and together with the description, serve to explain principles of the present teachings. In the figures.

DETAILED DESCRIPTION

Reference will now be made in detail to various embodiments of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific implementations in which may be practiced. These implementations are described in sufficient detail to enable those skilled in the art to practice these implementations and it is to be understood that other implementations may be utilized and that changes may be made without departing from the scope of the present teachings. The following description is, therefore, merely exemplary.

Figure 1:
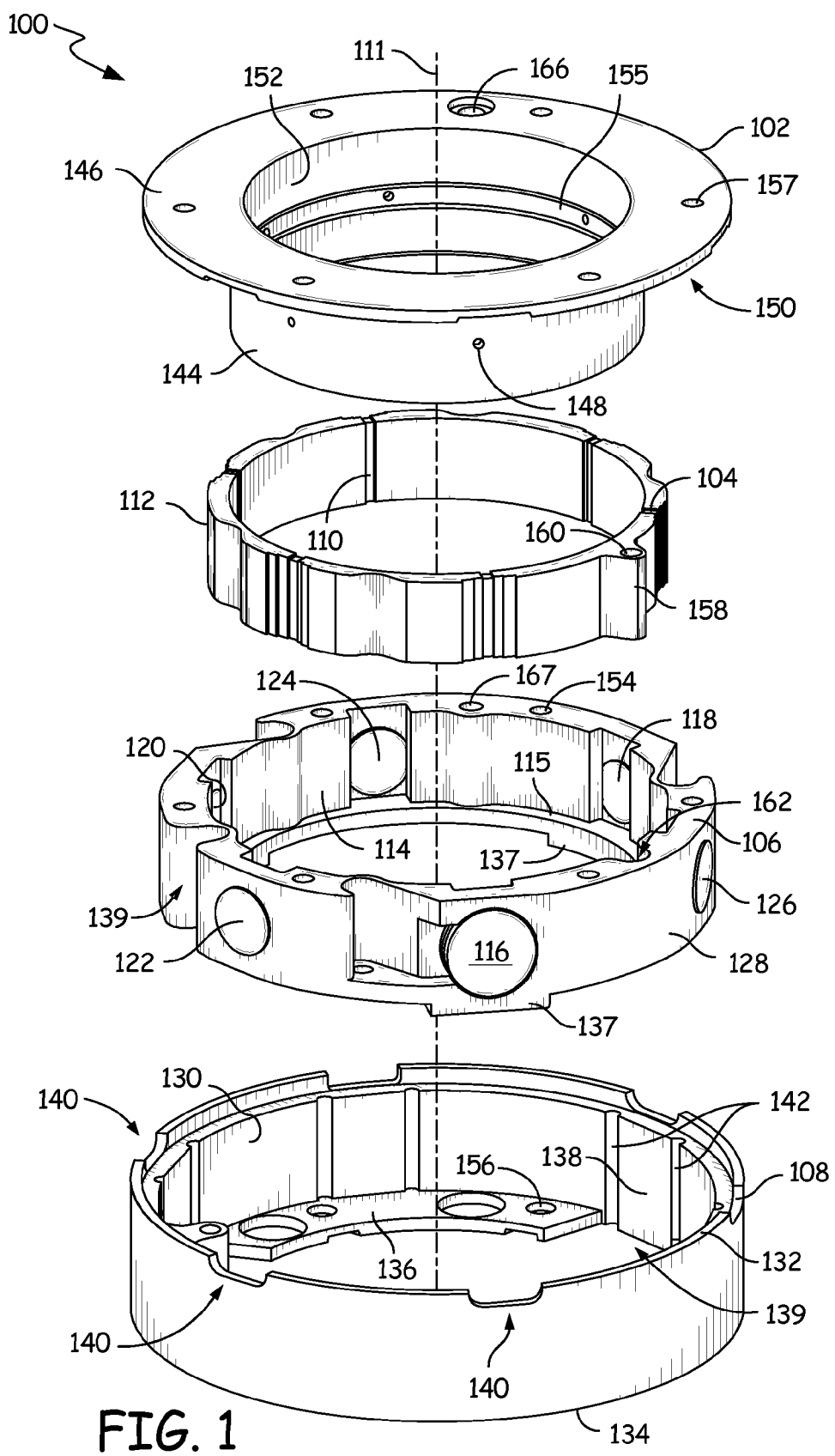
FIG. 1 illustrates a partial, exploded perspective view of a rotating rectifier assembly, according to an embodiment.

FIG. 1 illustrates a partial, exploded perspective view of a rotating rectifier assembly 100, according to an embodiment. The rotating rectifier assembly 100 generally includes a cover 102, an annular bus bar 104, an insulator ring 106, and an outer housing 108. The annular bus bar 104 may be generally rigid and may be generally toroidal in shape, extending about a central axis 111. The annular bus bar 104 may have any thickness suitable to provide sufficient electrical current carrying capacity and/or structural integrity in rotating embodiments. Further, the annular bus bar 104 may be of unitary construction, i.e., may be monolithic. The annular bus bar 104 may be constructed from one or more electrically conductive materials, such as, for example, copper.

Further, the annular bus bar 104 may have fluid channels 110 formed therein, which may extend axially along the annular bus bar 104, as shown. The annular bus bar 104 may also have one or more, for example six, contact spring reliefs 113 extending axially along and radially inwards from an outer diameter 112 of the annular bus bar 104.

The terms "axial" or "axially" and "radial" or "radially" are generally used herein to refer to directions in a cylindrical system, such as the illustrated embodiment of the rotating rectifier assembly 100. Accordingly, it will be appreciated that "axial" or "axially" refers to a direction parallel to or along the central axis 111 of the rotating rectifier assembly 100, while "radial" or "radially" refers to a direction extending perpendicular to the central axis 111.

As shown, the annular bus bar 104 may be received into the insulator ring 106, such that, for example, the outer diameter 112 of the annular bus bar 104 is adjacent to an inner surface 114 of the insulator ring 106 and abuts a radially and inwardly extending retaining wall 115 of the insulator ring 106. The outer diameter 112 of the annular bus bar 104 may be shaped (e.g., by casting, milling, cutting, etc.) to conform to the inner surface 114 of the insulator ring 106.

The insulator ring 106 may be formed from one or more insulating materials with suitable thermal and/or chemical resistance properties, such as, for example, a polyimide, a polyamide, a polyamide-imide, combinations thereof, or the like. In one specific embodiment, the insulator ring 106 may be formed at least partially from molded TORLON®. Further, the insulator ring 106 may be cast, molded, or otherwise formed so as to have a unitary construction, i.e., the insulator ring 106 may be monolithic.

The rectifier assembly 100 may further include one or more, for example, three pairs of diodes 116, 118, 120 and one or more, for example, three resistors 122, 124, 126. The combination of three pairs of diodes 116-120 and three resistors 122-126 may be suited for rectifying three-phase power; however, it will be appreciated that other numbers of diodes and resistors may be employed for other applications, without departing from the scope of the present disclosure. Further, the electrical functioning of the pairs of diodes 116-120 and the resistors 122-126 in a rectifier circuit will be appreciated by one of skill in the art. The diodes 116-120 and resistors 122-126 may be inserted into apertures, recesses, etc. that are formed in the insulator ring 106, as will be described in greater detail below. Moreover, the pairs of diodes 116-120 and the resistors 122-126 may be electrically connected to one another via the annular bus bar 104, which may be employed, e.g., instead of segments of bus bar strips.

The insulator ring 106 may be inserted into the outer housing 108, such that an outer surface 128 of the insulator ring 106 is adjacent to an inner diameter 130 of the outer housing 108. The outer housing 108 may have a first end 132 and a second end 134, each at opposite axial sides of the generally cylindrical outer housing 108. The insulator ring 106 may be inserted through the first end 132 to rest on a radially and inwardly projecting flange 136 at the second end 134 of the outer housing 108.

Additionally, the insulator ring 106 may include an alignment tabs or lugs 137, which may extend axially therefrom. The alignment tabs 137 may be configured to slide into gaps 139 formed in the flange 136 of the outer housing 108. Accordingly, the alignment tabs 137 and the gaps 139 may cooperate to provide an anti-rotation and/or alignment feature between the insulator ring 106 and the outer housing 108. In other embodiments, the outer housing 108 may include the alignment tabs 137 and the insulator ring 106 may include the gaps 139. Further, various other types of anti-rotation and/or alignment features may be incorporated so as to align the insulator ring 106 and the outer housing 108 and/or to prevent relative rotation therebetween. In some embodiments, however, such alignment and/or anti-rotation feature(s) may be unnecessary and omitted.

The outer housing 108 may be constructed at least partially of a thermally and electrically conductive material. One example of such a material may be aluminum. Accordingly, the outer housing 108 may include six contact pads 138 (three visible in this view), one for each of the pairs of diodes 116-120 and one for each of the resistors 122-126. The contact pads 138 may be generally flat areas in the inner diameter 130 of the outer housing 108. Further, the contact pads 138 may be positioned so as to align with the diodes 116-120 and the resistors 122-126. As such, the outer housing 108, made of the electrically conductive material, may act as a second DC bus bar, with the annular bus bar 104 acting as the first.

The outer housing 108 may also include one or more, for example, six fluid outlet ports 140 (five are visible) formed proximal, e.g., extending from, the first end 132. The fluid outlet ports 140 may be disposed at regular angular intervals around the periphery of the first end 132 of the outer housing 108. In at least one embodiment, the fluid outlet ports 140 may be aligned with the contact pads 138. Furthermore, the outer housing 108 may define relief grooves 142 on either circumferential side of each of the contact pads 138. Each of the relief grooves 142 may be formed so as to provide the flattened section of the otherwise generally circumferential inner diameter 130 of the outer housing 108. The relief grooves 142 may serve a second function as well, providing a recessed conduit extending axially between the flange 136 and the ports 140.

With the annular bus bar 104 received into the insulator ring 106, and the insulator ring 106 received into the outer housing 108, the cover 102 may be secured into place on the second end 134 of the outer housing 108. The cover 102 may have a cylindrical body 144 and a flange 146 extending radially outward therefrom. The cylindrical body 144 may include one or more fluid inlet ports 148 (four are visible). In some embodiments, the fluid inlet ports 148 may be circular, but in others may be elongated slots or any other suitable shape. Further, the fluid inlet ports 148 may be disposed in a groove 155, which may be formed in an inner diameter 152 of the cylindrical body 144 so as to provide a flowpath to the fluid inlet ports 148.

Moreover, the cylindrical body 144 of the cover 102 may be received into the annular bus bar 104 and into engagement with the flange 136 of the outer housing 108. The cover 102 may thus be received into the annular bus bar 104, such that the flange 146 is flush with the first end 132 of the outer housing 108. In some cases, the flange 146 may be a generally planar disk, but in other embodiments, as shown, may include one or more cutouts 150 (three are visible), which may be disposed about the periphery of the flange 146, for example, configured to align with the ports 140 of the outer housing 108, so as to cooperatively provide a fluid passage extending radially outward from the rectifier assembly 100. The cover 102 may be made of any suitable insulating material with desired properties such as, for example, those discussed above with respect to the insulator ring 106. In any particular embodiment, however, the cover 102 and the insulator ring 106 may or may not be made of the same material.

The flange 146 may be secured to the flange 136 of the outer housing 108, for example, via screws extending through holes 157 in the flange 146, through bores 154 defined in the insulator ring 106 and, for example, threading through tapped holes 156 defined in the flange 136. In other embodiments, the holes 156 may not be tapped and nuts may be provided on the lower side, so as to secure the screws in place. Such nuts (not shown) may be "captive" such that they are prevented from rotating relative to the outer housing 108 while being threaded to the screws, for example, by a non-circular head that is received into a non-circular chamfer.

Further, the annular bus bar 104 and/or the insulation ring 106 may include an alignment or anti-rotation feature. For example, the annular bus bar 104 may include an alignment protrusion 158, which may have a bore 160 defined therein and extending axially therethrough. The bore 160 may serve as an electrical connection to support the functioning of the rectifier assembly 100. The alignment protrusion 158 may be received into an alignment recess 162, defined in the insulator ring 106 and extending outward from the inner surface 114 thereof. The retaining wall 115 may define a hole 164 aligned with the alignment recess 162. Further, the flange 146 of the cover 102 may define an alignment hole 166, which may be aligned with the bore 167. Accordingly, when the annular bus bar 104 is received into the insulator ring 106, the alignment protrusion 158 may be received into the alignment recess 162, so as to prevent relative rotation between the annular bus bar 104 and the insulation ring 106. When the cover 102 is secured onto the outer housing 108, a bolt, post, pin, etc. may be received through the bore 167, through the alignment hole 166. In other embodiments, the bolt, post, bar, etc. may be retained extending through at least the bore 167 and one of the alignment holes 166 and/or 167 in any other manner.

Figure 2:
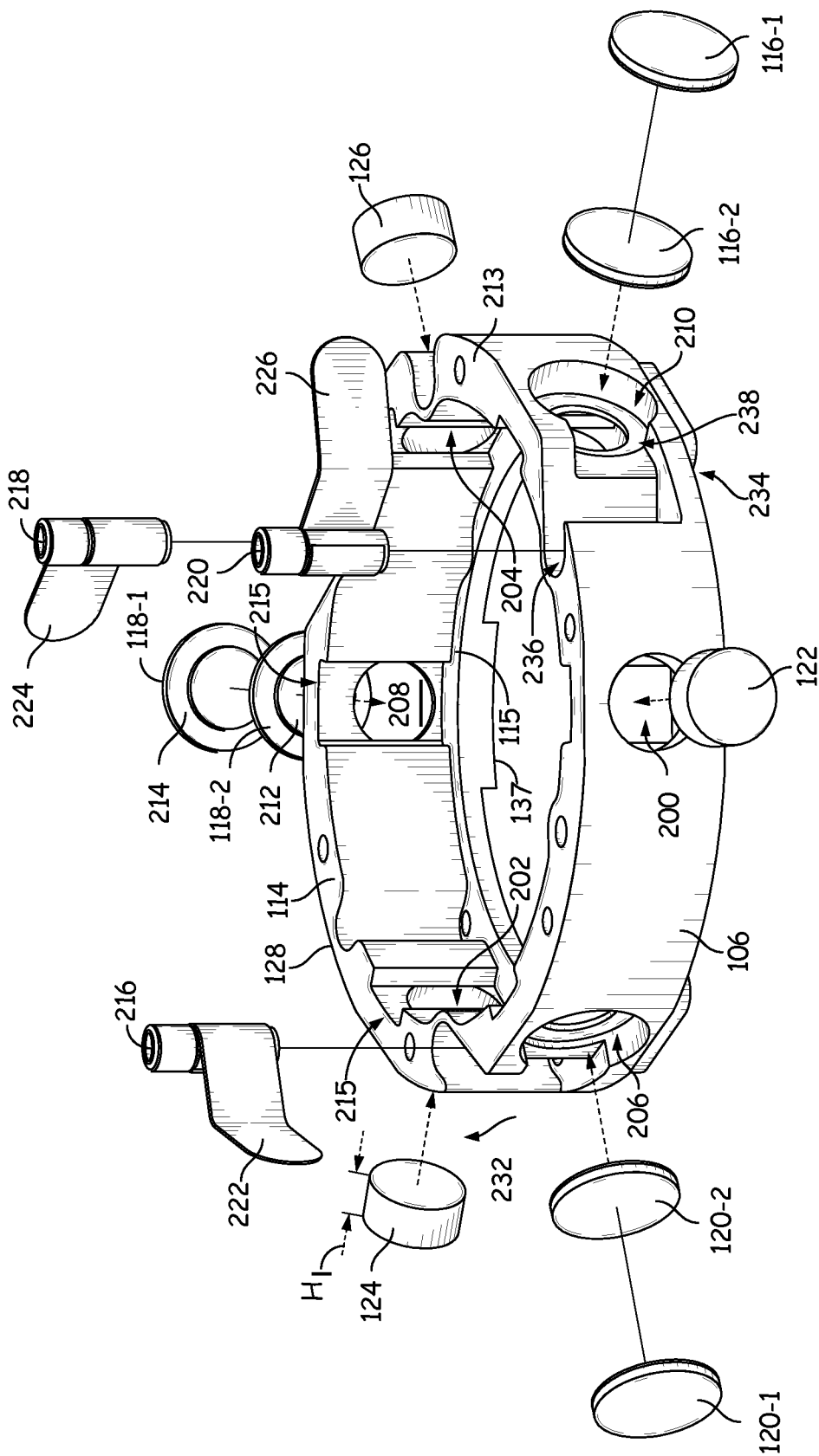
FIG. 2 illustrates an exploded perspective view of an insulator ring of the rotating rectifier assembly, according to an embodiment.

FIG. 2 illustrates an exploded view of the insulator ring 106, the pairs of diodes 116-120, and the resistors 122-124, according to an embodiment. With continuing reference to FIG. 1, the insulator ring 106 may have an alignment and/or an anti-rotation feature configured to engage the outer housing 108 and prevent relative rotation therebetween. For example, the insulator ring 106 may include an alignment tab 137 extending axially therefrom, as shown, toward the second end 134 of the outer housing 108 (FIG. 1). The alignment tab 137 may align with a gap in the flange 136 of the outer housing 108. The alignment tab 137 may also serve to provide sufficient material in insulator ring 106 to support diodes 116-118. In other embodiments, other types of alignment/anti-rotation features may be employed instead of or in addition to the alignment tab 137. However, in some embodiments, such a feature may be omitted.

Figure 3:
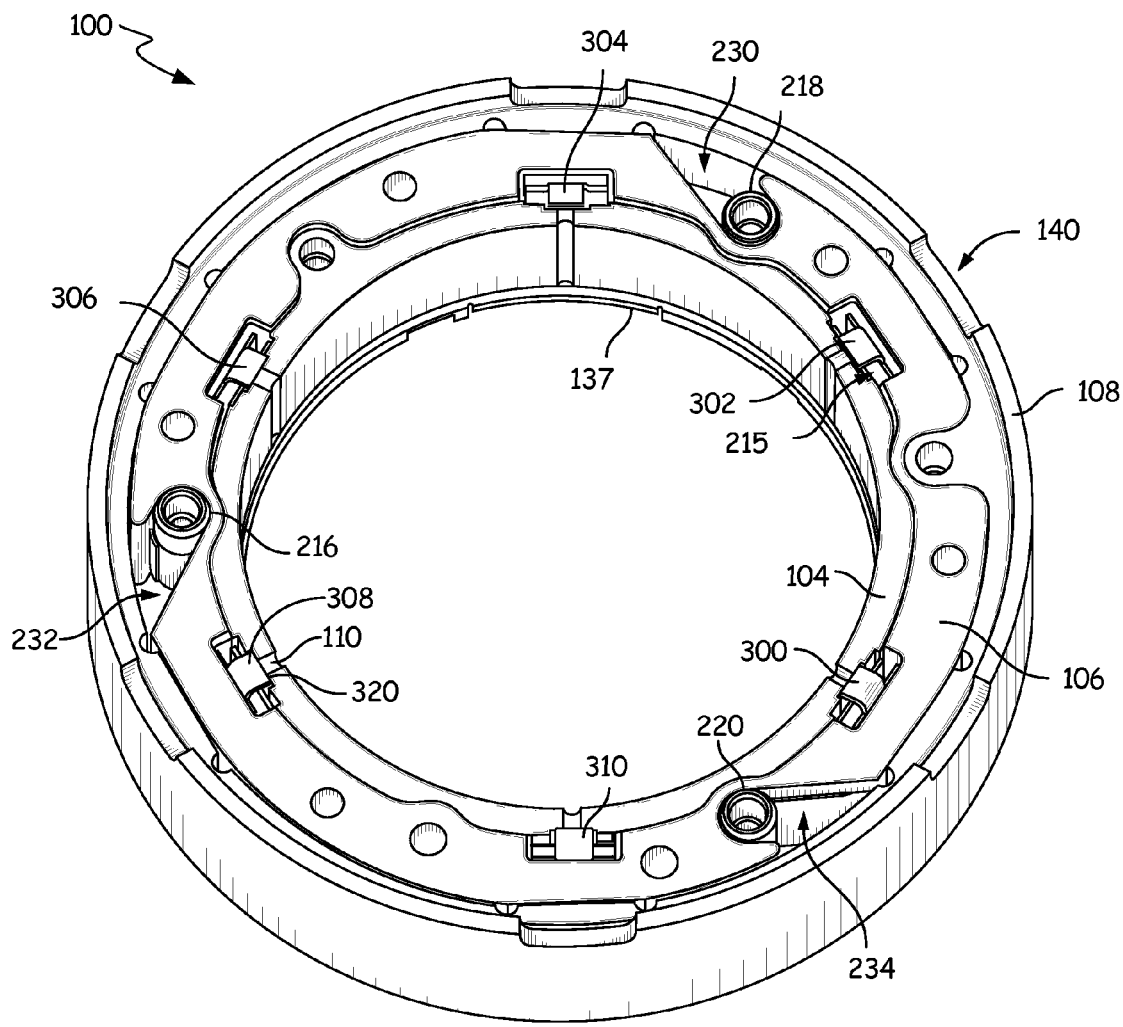
FIG. 3 illustrates a top perspective view of the rotating rectifier assembly, with the cover removed, according to an embodiment.

With continuing reference to FIG. 2, FIG. 3 illustrates a top perspective view of the rectifier assembly 100, with the cover 102 removed, according to an embodiment. Each of the resistors 122-124 may be received into a resistor pocket 200, 202, 204 defined in the insulator ring 106. The resistor pockets 200, 202, 204 may be disposed at approximately equal intervals around the insulator ring 106. The resistor pockets 200-204 may extend radially inward between the inner and outer surfaces 114, 128 of the insulator ring 106. Further, as best viewable for resistor pocket 200, the resistor pockets 200-204 may have a stepped profile, such that the resistor pockets 200-204 have a greater radius at the outer surface 128 than at an area proximal the inner surface 114. The smaller radius may be smaller than the radius of the resistors 122-126, such that the stepped profile prevents the resistors 122-126 from proceeding through the insulator ring 106 from the outer surface 128 toward and out through the inner surface 114.

Similarly, the pairs of diodes 116, 118, 120 (which, as shown, may each include two diodes 116-1 and 116-2, 118-1 and 118-2, and 120-1 and 120-2 stacked together) may each be received into a diode pocket 206, 208, 210, with the diode pockets 206-210 being disposed at approximately equal 120 degree intervals around the insulator ring 106. The diode pockets 206-210 may include a stepped profile, so as to prevent the diodes 116-120 from travelling through the inner surface 114 of the insulator ring 106. In various embodiments, the diodes 116-120 may be shaped as a stepped cylinder, with the smaller diameter portion 212 (visible for diode 118-2) facing radially inward and a larger diameter portion 214 facing radially outward. In such cases, the radius of the diode pocket 206-210 at the inner surface 114 may be less than the radius of the smaller diameter portion 212, or less than a radius of a larger portion 214 thereof.

The insulator ring 106 may also include spring recesses 215 at the inner surface 114, aligned with each of the resistor pockets 200-204 and at each of the diode pockets 206-210. In an embodiment, the spring recesses 215 may extend downward from an end 213 of the insulator ring 106 and to the retaining wall 115 thereof and may have a generally rectangular profile. In other embodiments, other shapes and locations may be employed.

The rotating rectifier assembly 100 (FIG. 1) may also include one or more AC posts 216, 218, 220, each with a conductive AC tab 222, 224, 226 extending therefrom. Further, the insulator ring 106 may define AC bus pockets 230, 232, 234 (234 is visible in FIG. 3). Each of the AC bus pockets 230-234 may be disposed circumferentially adjacent to one of the diode pockets 206-210. Further, each of the AC bus pockets 230-234 may include a cylindrical portion 236 sized to receive one of the AC posts 216-220, and a circumferential extension 238 sized to receive the AC tab 222-226 extending therefrom.

Accordingly, once assembled, an end of each of the AC tabs 222-226 may be sandwiched between the radially inward diode 116-2, 118-2, 120-2 and the radially outward diode 116-1, 118-1, 120-1, such that the AC tabs 222-226 provide an electrical lead between the AC post 216-220 and the diodes 116-118, enabling the AC posts 216-220 to act as AC buses. Once assembled, each outer diode 116-1, 118-1, 120-1, as well as the resistors 122-126, may be positioned radially such that their outer surface is in physical contact with the electrically conductive outer housing 108 serving as a DC bus.

Figure 4:
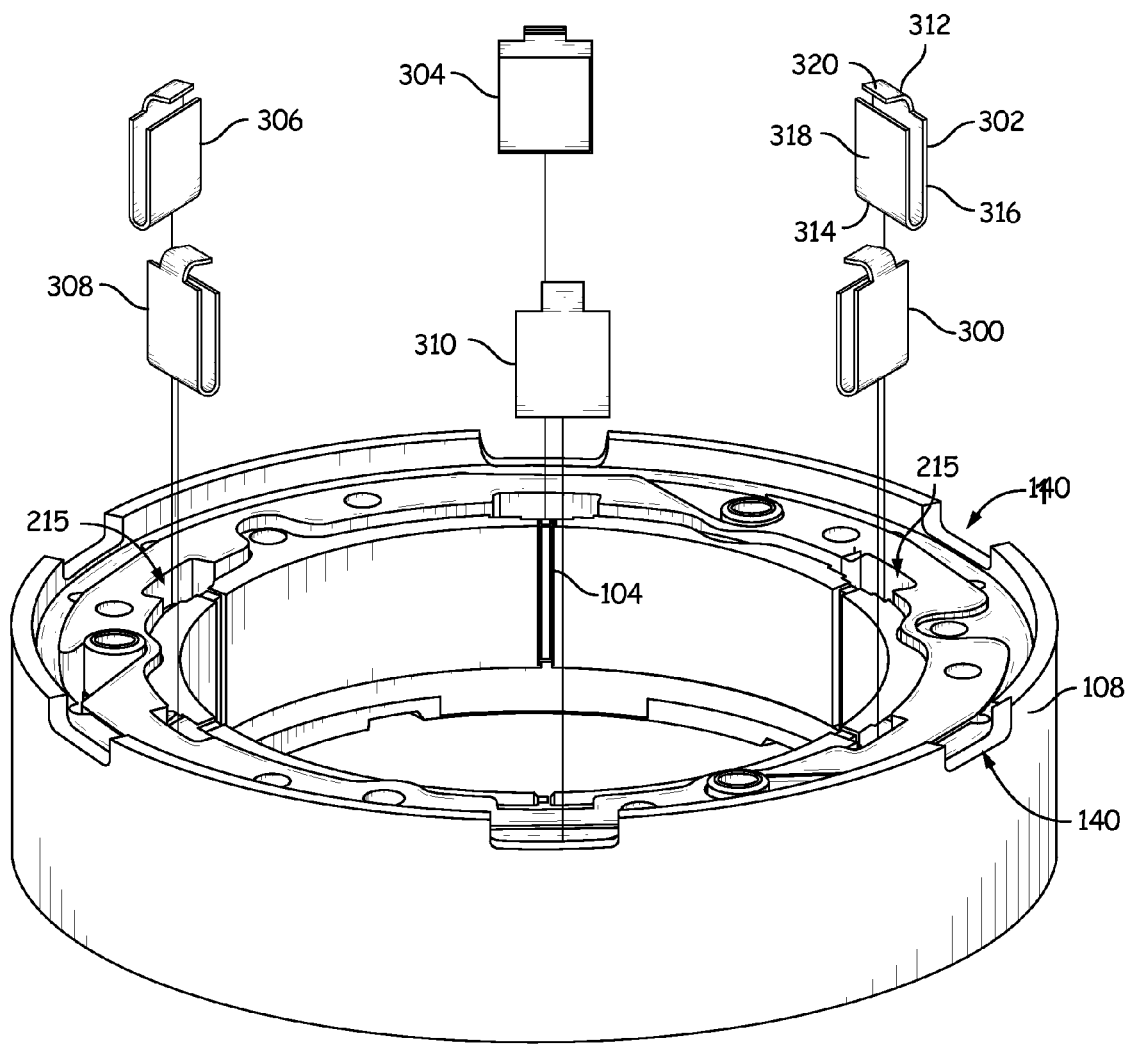
FIG. 4 illustrates a partial, exploded perspective view of spring clips being inserted into the rotating rectifier assembly, according to an embodiment.

With continuing reference to FIG. 3, FIG. 4 additionally illustrates insertion of electrical conductors, for example, spring clips 300, 302, 304, 306, 308, 310, so as to electrically connect the diodes 116-120 and resistors 122-126 (e.g., FIG. 1) with the annular bus bar 104. The spring clips 300-310 may be inserted into the spring recesses 215 defined by the insulator ring 106 and the contact spring reliefs 113 of the annular bus bar 104. Each of the springs 300-310 may include one or more, for example, two bends 312, 314, and two generally flat contact portions 316, 318. Further, each of the spring clips 300-310 may include a flow diverter 320, which may take the form of a tab, as shown, that extends past the edge of the contact portion 316. The flow diverter 320 may also act as an insertion assistance feature for the spring clips 300-310. Furthermore, each of the spring clips 300-310 may be constructed from an electrically conductive material, such as aluminum or copper, with a suitable resiliency and electrical conductivity. Accordingly, when inserted into the spring recesses 215, the conductive spring clips 300-310 provide electrical connectivity between the annular bus bar 104 and the adjacent resistor 122-126 or diode pair 116-120 via the contact portions 316, 318. Furthermore, the flow diverter 320 may align with the fluid channel 110 formed in the annular bus bar 104, such that the flow diverter 320 obstructs or hangs over the fluid channel 110, as best shown in FIG. 3 (indicated for spring clip 308), thereby directing fluid towards the resistor 122-126 or diode pair 116-120.

Figure 5:
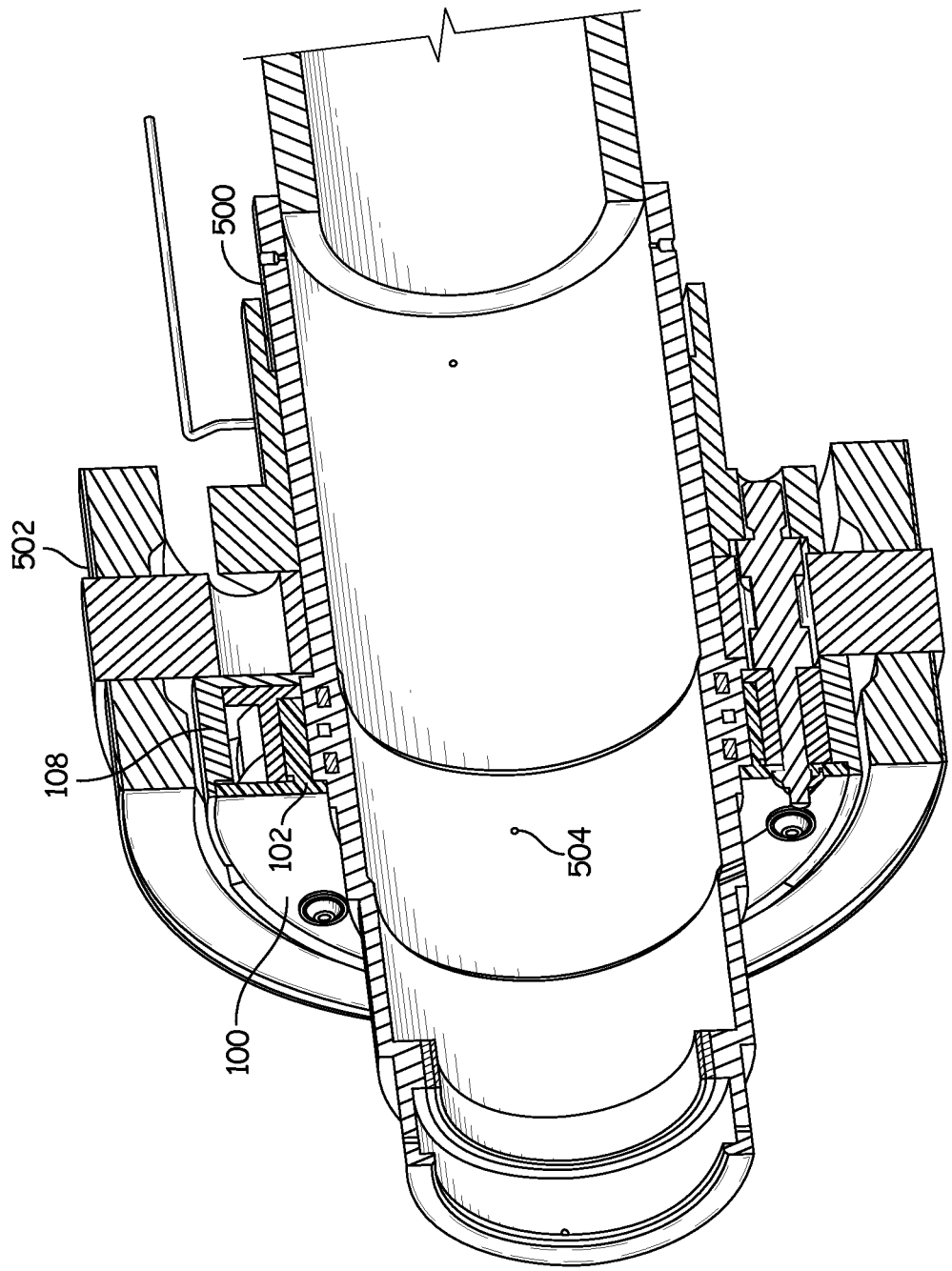
FIG. 5 illustrates a sectional view of the rotating rectifier assembly mounted to a shaft adjacent to an exciter, according to an embodiment.

FIG. 5 illustrates a sectional view of the rotating rectifier assembly 100 mounted to a shaft 500 so as to rotate therewith, according to an embodiment. As shown, the rectifier assembly 100 may be disposed adjacent to, e.g., abutting, an exciter 502 of a brushless alternator system. Further, the shaft 500 may be hollow, and may have a coolant flowpath defined therein. The shaft 500 may also include coolant delivery holes 504 extending therefrom.

Referring now additionally to FIG. 1, the coolant delivery holes 504, in operation, may fluidly communicate coolant from the hollow interior of the shaft 500 to the fluid inlet ports 148 of the cover 102 (FIG. 1) of the rectifier assembly 100. The coolant may then enter the interior of the rectifier assembly 100. The coolant may be driven by pressure or, when the shaft is rotating, by inertial forces radially outward. Thus, the coolant may proceed axially, in either direction, along the annular bus bar 104 after being received through the fluid inlet ports 148. For example, the coolant may tend to migrate to the slightly increased radius of the fluid channels 110, and then proceed axially toward or away from the flow diverters 320. Thereafter, the coolant may be received between the annular bus bar 104 and the insulator ring 106, particularly in the spring recesses 215 with the aid of the flow diverters 320. Further, the coolant may proceed in either axial direction and then radially outwards and into the annulus defined between the insulator ring 106 and the outer housing 108.

The coolant may flood the area between the outer housing 108 and the diodes 116-120 and the resistors 122-126. The resistor pockets 200-204 and the diode pockets 206-210 provide an annulus between the diode pairs 116-120 and resistors 122-126, thus providing a space through which the coolant may flow and absorb heat. Once reaching the outer housing 108, the coolant may accumulate at the relief grooves 142 and then flow out of the rectifier assembly 100 via the fluid outlet ports 140. Accordingly, via this fluid circuit, coolant fluid may be fluidly communicated between the fluid inlet ports 148 and the fluid outlet ports 140.

Referring again to FIG. 5, as shown, the thermally conductive outer housing 108 may be disposed adjacent to, e.g., abutting the exciter 502. Accordingly, the outer housing 108 may transfer heat to the exciter 502 by conduction, thereby assisting the cooling provided by the coolant circuit described above. The electrically conductive outer housing, also acting as a DC bus, may be in contact with the exciter 502, thereby providing an electrical grounding path for the rectifier assembly 100.

Figure 6:
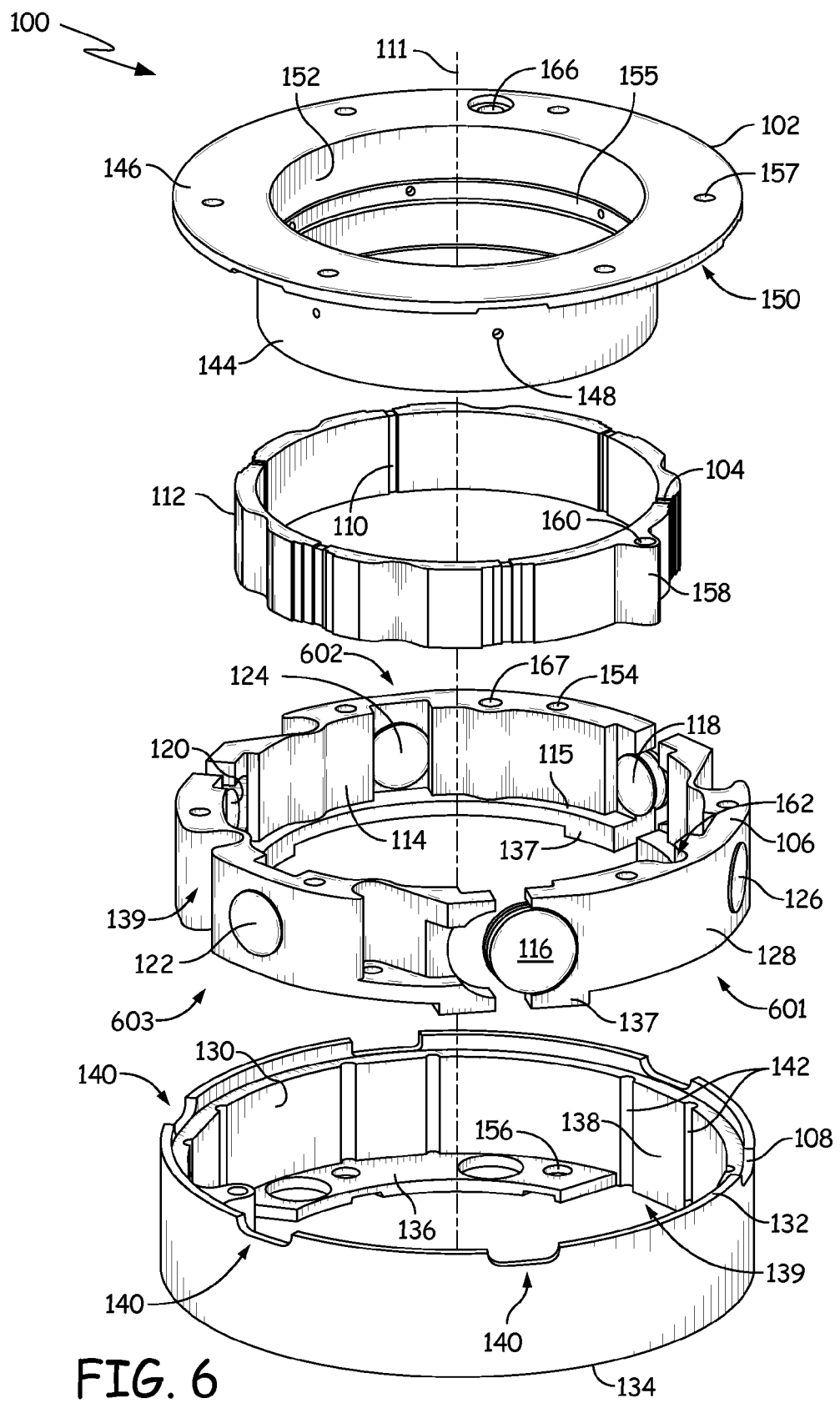
FIG. 6 illustrates another embodiment of the rotating rectifier assembly.

FIG. 6 illustrates another embodiment of the insulator ring 106, which may be similar to the embodiment of FIG. 1. As shown, instead of being a monolithic structure, the insulator ring 106 may be provided in two or more, for example, three segments 601, 602, 603. In an embodiment, each segment 601-603 may contain one of the resistors 122-126 and one of the AC bus pockets 230-234, with each segment 601-603 terminating circumferentially at the middle of one of the diode pockets 206-210, so as to contain a portion of the diode pockets 206-210. In other embodiments, the segments 601-603 may be split in other locations, and the segments may or may not be of uniform dimensions. Further, it will be appreciated that additional or fewer segments 601-603 may be employed. The segmenting of the insulator ring 106 may provide a reduced-stress embodiment, where the segments 601-603 are able to migrate radially outwards to rest against the outer housing 108 for support under high rotation conditions.

Figure 7:
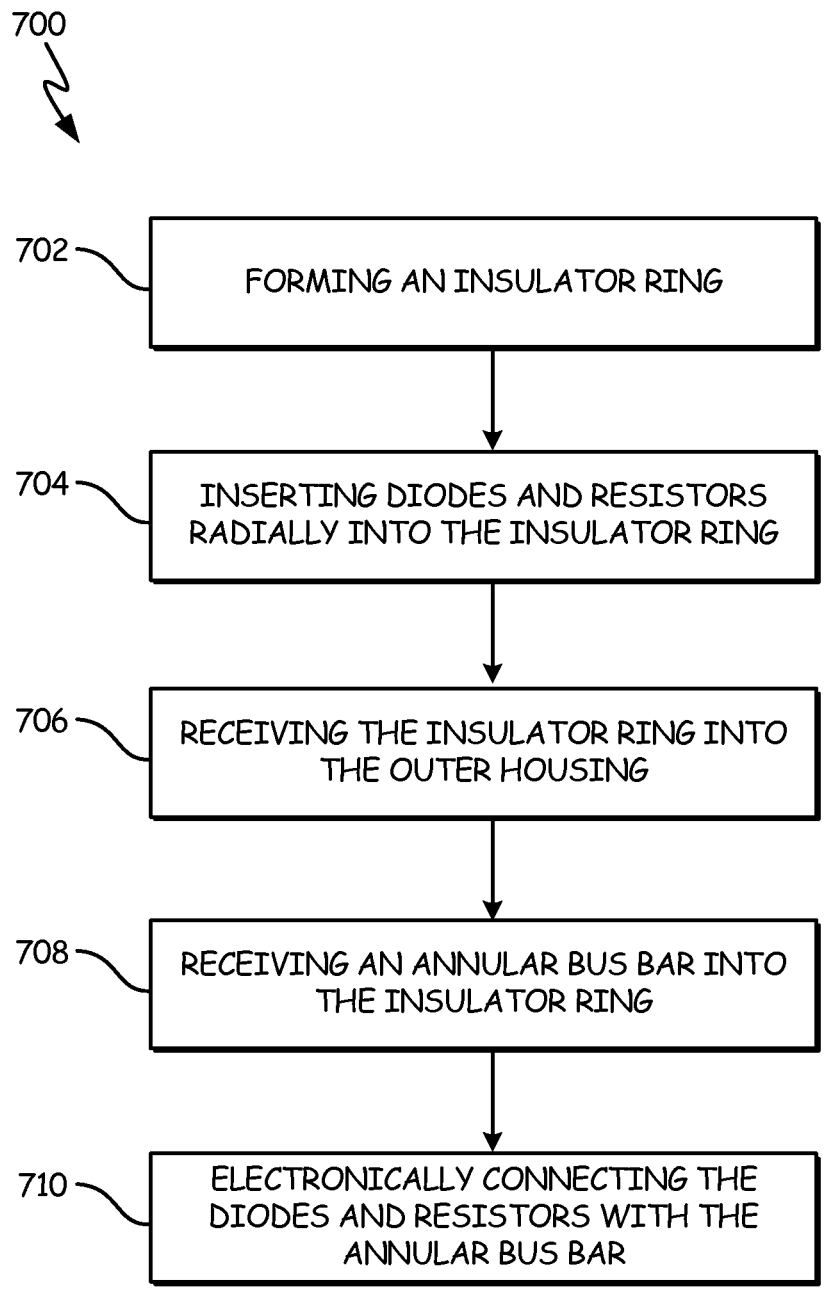
FIG. 7 illustrates a flowchart of a method for manufacturing a rotating rectifier assembly, according to an embodiment.

FIG. 7 illustrates a flowchart of a method 700 for manufacturing a rotating rectifier assembly, according to an embodiment. The method 700 may proceed so as to result in an assembled rotating rectifier assembly 100, and may thus be best understood with reference to the embodiments thereof illustrated in FIGS. 1-6. However, it will be appreciated that the method 700 is not limited to any particular structure, unless otherwise expressly stated herein.

The method 700 may proceed by forming the insulator ring 106, as at 702, for example, by casting, molding, or the like. In at least one embodiment, forming the insulator ring 106 may be free from secondary machining operations. In another embodiment, forming the insulator ring 106 may be free from secondary machining operations that require a tool to access the inner surface 114 and, for example, make cuts into the inner surface 114. For example, the simplified geometry and reduced fastener and/or component counts provided by the monolithic, annular bus bar 104 may avoid such secondary machining.

The method 700 may then proceed to inserting one or more resistors 122-126, one or more diode pairs 116-120, and one or more AC posts 218-222 and AC tabs 224-228 into their respective pockets 200-204, 206-210, 232-236, as at 704. In an embodiment, the radially inward diodes 116-2, 118-2, 120-2 may be inserted before the AC tabs 224-228, with the radially outward diodes 116-1, 118-1, 120-1 being inserted after the AC tabs 224-228, such that the AC tabs 224-228 may be disposed between the diode pairs 116, 118, 120. The AC tabs 224-228 may be placed by folding the tabs 224-228 and/or by rotating the AC posts 218-222.

The method 700 may further include receiving the insulator ring 106, for example, after the inserting at 704, into the outer housing 108, as at 706. In an embodiment, the insulator ring 106 may be aligned with the outer housing 108 using an alignment feature, as discussed above, or may be arranged and aligned without such a feature. In an embodiment, the bores 154 of the insulator ring 106 may be aligned with the holes 156 in the flange 136 of the outer housing 108. Further, the diodes 116-120 and resistors 122-126 may be aligned with the contact pads 138 of the outer housing 108. In segmented embodiments of the insulator ring 106 (e.g., FIG. 6), the segments 601-603 may be inserted in sequence or all at once.

Further, nuts (not shown) may be received into the holes 156, from the bottom, opposite the insulator ring 106. In an embodiment, the nuts may be held captive, e.g., by having an anti-rotation coupling (e.g., a non-circular head coupled with a non-circular chamfer). In other embodiments, such an anti-rotation coupling may be omitted. Further, in some cases, the holes 156 may be threaded, allowing the nuts to be omitted. In some other cases, rivets, welds, etc. may be employed instead of or in addition to such nuts and/or holes 156.

In an embodiment, the method 700 may then proceed to receiving the annular bus bar 104 into the insulator ring 106, as at 708. The annular bus bar 104 and the insulator ring 106 may cooperate to provide an anti-rotation feature, which may be engaged by receiving the annular bus bar 104 into the insulator ring 106. For example, the alignment protrusion 158 may be received into the alignment recess 162.

The method 700 may also include inserting the springs 300-310 into the spring recesses 215 of the insulator ring 106, as at 710. In one embodiment, the springs 300-310 may be received into the recesses 215 after the annular bus bar 104 is received into the insulator ring 106. In such an embodiment, the springs 300-310 may be slid into place through the top of the spring recesses 215 and towards the retaining wall 115. In another embodiment, the springs 300-310 may be placed into the recesses 215 and then the annular bus bar 104 may be received at 708. Next, the method 700 may include securing the cover 102 through the annular bus bar 104 and to the outer housing 108, for example, by threading screws through the holes 157 in the flange 146 of the cover 102.

Figure 8:
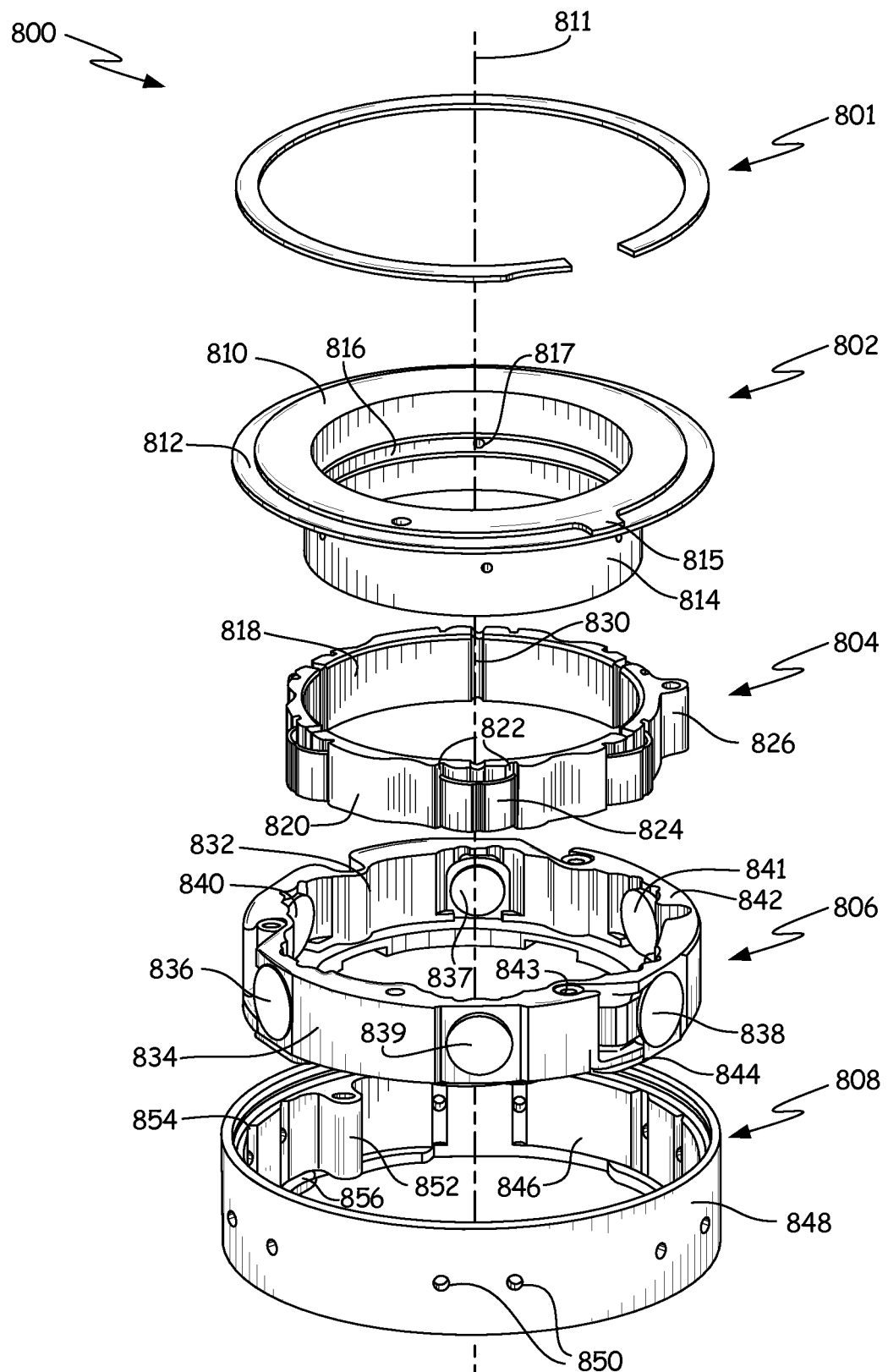
FIG. 8 illustrates an exploded perspective view of a rotating rectifier assembly according to another embodiment.

FIG. 8 illustrates an exploded perspective view of rotating rectifier assembly 800 according to another embodiment. The rotating rectifier assembly 800 generally includes a snap ring 801, a cover 802, an annular bus bar 804, an insulator ring 806, and an outer housing 808. The annular bus bar 804 is assembled radially interior of the insulator ring 806, which in turn is assembled radially interior of the outer housing 808. The cover 802 is assembled last and acts to retain, along with snap ring 801, each of the previous assembled portions within the outer housing 808. In contrast with the embodiments shown in FIG. 1, the embodiment shown in FIG. 8 does not require screws/bolts to retain the cover 802. Instead, the snap ring 801 is used to retain the cover 802.

The cover 802 includes a flange 810 having an annular channel 812 that extends around a majority of the outer circumference of the flange 810, and a cylindrical portion 814 that extends axially away from the flange 810. In the embodiment shown in FIG. 8, the cover 802 further includes a circumferential groove 816 that extends around the inner annular diameter of the cover 802, and one or more fluid passages 817 extending radially outward though the cylindrical portion 814 of the cover 802. The fluid passage 817 allows cooling fluid (e.g., oil) to be communicated from a shaft (not shown) radially outward through the cover 802 to other portions of rotating rectifier assembly 800.

The annular channel 812 is sized to receive the snap ring 801, which is also discontinuous, for securing the cover 802 to the outer housing 808. The discontinuous portion of the snap ring 801 is aligned with the discontinuous portion of the annular channel 812. Once installed, the discontinuous portion of the annular channel 812 prevents the snap ring 801 from rotating within the cover 802. The snap ring 801 is installed once the cover 802, the annular bus bar 804, and the insulator ring 806 have been fit within the outer housing 808. The snap ring 801 is placed into the annular channel 812, and engages with a snap ring retention channel 854 (described in more detail below with respect to the outer housing 808), which is located around an inner circumference of the outer housing 808.

The annular bus bar 804 includes inner surface 818, outer surface 820, a plurality of axial groove pairs 822 (only the nearest pair is labeled) located on the outer surface 820 for retaining a plurality of springs 824 (again, only the nearest spring is labeled), an alignment feature 826, and one or more axial channels 830 circumferentially spaced around the interior surface 818 of the inner bus assembly 804.

The inner surface 818 is configured to receive the cylindrical portion 814 of the cover 802. The axial channels 830 are in fluid communication with the circumferential groove 816 of the cover 802, to receive and distribute in an axial direction cooling fluid provided via fluid passage 818. The pairs of axial grooves 822 located on the outer surface 820 have a geometry (shown in more detail in FIG. 9) that enables capture of the respective legs of each spring 824.

The annular bus bar 804 may once again be generally rigid and may be generally toroidal in shape, extending about a central axis 811. The annular bus bar 804 may have any thickness suitable to provide sufficient electrical current carrying capacity and/or structural integrity in rotating embodiments. In addition, in the embodiment shown in FIG. 8 the annular bus bar 804 is unitary and is constructed of a conductive material such as copper.

As shown, the annular bus bar 804 is received into the insulator ring 806, such that, for example, the outer diameter 820 of the annular bus bar 804 is adjacent to an inner surface 832 of the insulator 806 and abuts a radially and inwardly extending retaining wall 842 of the insulator ring 806. The outer diameter 820 of the annular bus bar 804 may be shaped (e.g., by casting, milling, cutting, additive manufacturing, etc.) to conform to the inner surface 832 of the insulator ring 806. The alignment feature 826 of the annular bus bar 804 engages within the inwardly extending retaining wall 842 to provide proper alignment between the inner bus assembly 804 and the insulator ring 806 to prevent rotation of the components with respect to one another.

In the embodiment shown in FIG. 8, the plurality of leaf springs 824 are installed into the axial grooves 822 of the annular bus bar 804 prior to installation of the annular bus bar 804 within the insulator 806. The leaf springs 824 can be compressed in an radial direction (i.e., perpendicular with center axis 811), which allows the leaf springs 824 to be compressed radially as the annular bus bar 804 is installed within the insulator ring 806. In another embodiment, the annular bus bar 804 is installed within the insulator ring 806 prior to installation of the leaf springs 824. After the annular bus bar 804 has been installed within the insulator ring 806, then the leaf springs are inserted in an axial direction (i.e., parallel with central axis 811) into the axial grooves 822 of the annular bus bar 804.

The insulator ring 806 includes the inner surface 832, an outer surface 834, a plurality of circumferentially spaced apertures for receiving diode pairs 836, 837, and 838, a plurality of circumferentially spaced apertures for receiving resistors 839, 840 and 841, an axially extending channel 842 for receiving the alignment feature 826 of the inner bus assembly 804, one or more terminal 843 (only the nearest terminal is clearly visible and labeled), and one or more conductive tabs 844 (again, only the nearest tab 844 is shown). The insulator ring 806 may once again be formed from one or more insulating materials with suitable thermal and/or chemical resistance properties, such as, for example, a polymide, a polyamide, a polyamide-imide, combinations thereof, or the like. In one embodiment, the insulator ring 806 may be formed at least partially from molded TORLON. Further, the insulator ring 806 may be cast, molded, or otherwise formed so as to have a unitary construction.

In the embodiment shown in FIG. 8, an AC input provided to the rotating rectifier assembly 800 is provided via the one or more terminal 843, which communicate the AC input to one of the pairs of diodes 836, 837, or 838 via the adjacent conductive tab 844. The combination of three pairs of diodes 836, 837, and 838 and one or more, for example, three resistors 839, 840, and 841 act to rectify three-phase power; however, it will be appreciated that other numbers of diodes and resistors may be employed for other applications, without departing from the scope of the present disclosure. Further, the electrical functioning of the pairs of diodes 836, 837, and 838 and the resistors 839, 840, and 841 in a rectifier circuit will be appreciated by one of skill in the art. The pairs of diodes 836, 837, and 838 and resistors 839, 840, and 841 may be inserted into apertures, recesses, etc. that are formed in insulator ring 806. In addition, the pairs of diodes 836, 837, and 838 and the resistors 839, 840, and 841 are electrically connected to one another via the annular bus bar 804, which receives the rectified output provided by the pairs of diodes 836, 837, and 838.

The outer housing 808 includes an inner diameter 846, an outer diameter 848, one or more fluid outlet ports 850 (two nearest ports are labeled), an alignment portion 852, a snap ring retention channel 854, and a flange portion 856. As shown, the insulator ring 806 is received into the outer housing 808, such that, for example, the outer diameter 834 of the insulator ring 806 is adjacent to an inner diameter 846 of the outer housing 808 and is retained by a radially inwardly extending protrusion 852. The outer diameter 834 of the insulator ring 806 may be shaped (e.g., by casting, milling, cutting, additive manufacturing, etc.) to conform to the inner diameter 846 of the insulator ring 806. The axially extending channel of the insulator ring 806 engages within the axial protrusion 852 (which extends radially inward) to provide proper alignment between the inner bus assembly 804 and the insulator ring 806 to prevent rotation of the components with respect to one another. The insulator ring 806 rests against inwardly projecting flange 856 at a distal end of the outer housing 808.

The snap ring retention channel 854 extends circumferentially around the inner diameter 846 of the outer housing 808, and is configured to receive the snap ring 801 after the cover 802, the inner bus assembly 804, and the insulator ring 806 have been installed within the outer housing 808. The snap ring 801 is positioned within the annular channel 812, with the outer circumference of the snap ring 801 being located into the snap ring retention channel 854. In this way, the snap ring 801 retains the plurality of components axially within the outer housing 808.

Figure 9:
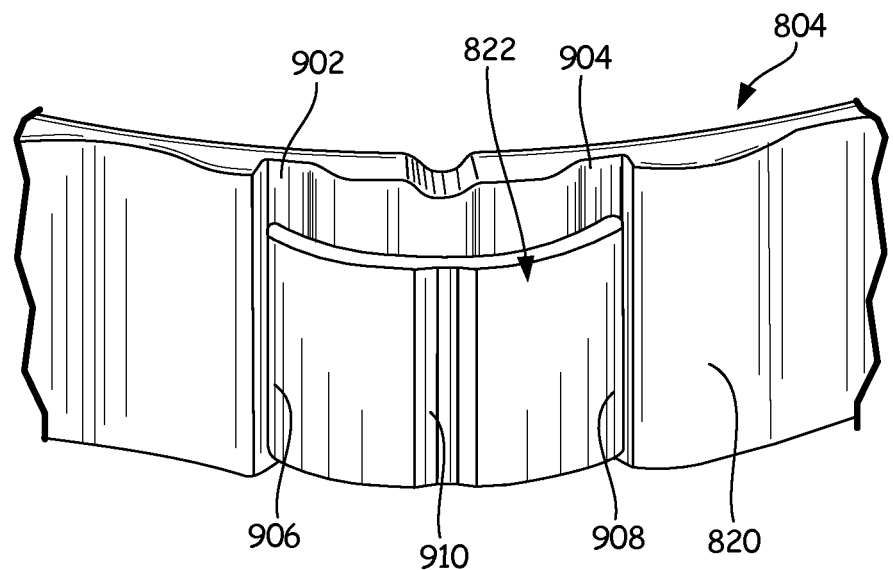
FIG. 9 illustrates a partial, exploded perspective view of leaf clips being inserted into inserted into the rotating rectifier assembly, according to an embodiment.

FIG. 9 is an enlarged view of one of the leaf-springs 822 installed within the inner bus assembly 804. As discussed above, leaf spring 822 provides electrical contact between inner bus assembly 804 and one of the pair of diodes 836, 837, and 838 or one of the plurality of resistors 839, 840, and 841. In particular, inner bus assembly 804 includes a pair of retaining walls 902 and 904 for receiving first and second ends 906 and 908, respectively, of leaf spring 822. Retaining walls 902 and 904 capture leaf spring 822 within inner bus assembly 804, thereby providing electrical contact with the inner bus assembly 804. A center portion 910 of leaf spring 822 extends away from the inner bus assembly 804 and when installed provides electrical contact with one of the plurality of diodes 836, 837, and 838. In addition to electrical contact, the leaf spring 822 provides a radially outward force that is applied to one of the diode pairs 836, 837, and 838 or resistors 839, 840, and 841. This outward radial force ensures good electrical contact between the respective diode pair or resistor and the outer housing 808.

Figure 10:
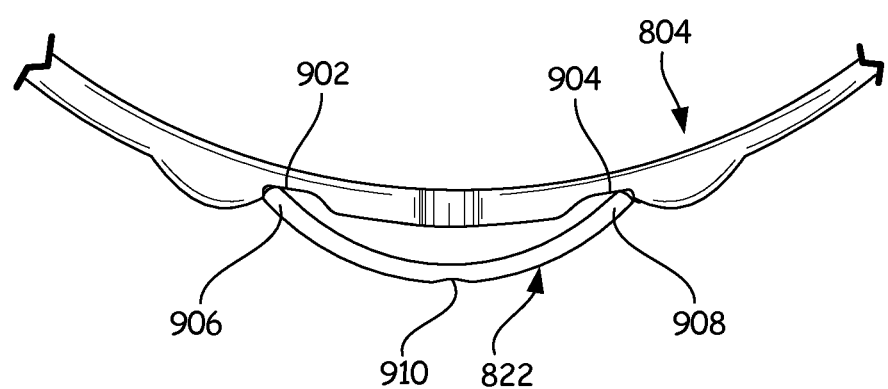
FIG. 10 illustrates a partial, exploded perspective view of a snap ring being inserted into the rotating rectifier assembly, according to an embodiment.

FIG. 10 is a top view of the leaf spring 822 installed within the inner bus assembly 804. In particular, the first end 906 of the leaf spring 822 is illustrated as fitting within the retaining wall 902, and the second end 908 of the leaf spring 822 is illustrated as fitting within the retaining wall 904. The first and second ends 906 and 908 are shaped to conform with the shape of retaining walls 902 and 904, respectively. In the embodiment shown in FIG. 10, the leaf spring 822 is curved from the center portion 910 to first and second ends 906 and 908.

In addition, adjacent to each of the first and second retaining walls 902 and 904 is a flat portion 912 and 914, respectively, that extends away from the first and second retaining walls 902 and 904 towards the outer circumference 820 of the inner bus assembly 804. The purpose of the flat portions 912 and 914 is to provide a relief area that allows the leaf spring 822 to be compressed when the inner bus assembly 804 is fit within the insulator ring 806 (shown in FIG. 8).

Figure 11:
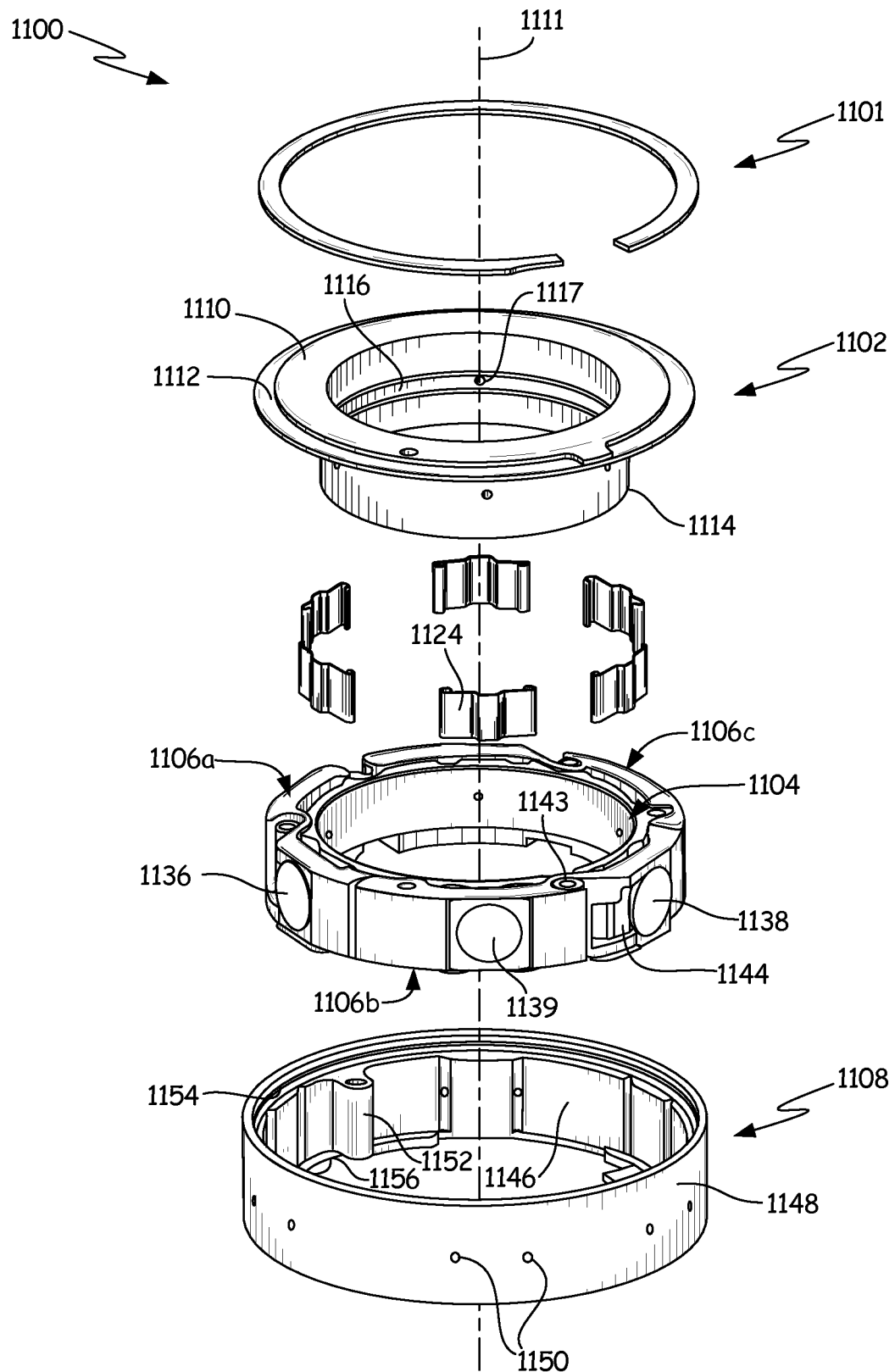
FIG. 11 illustrates an assembly view of the rotating rectifier assembly according to an embodiment.

FIG. 11 illustrates an exploded perspective view of rotating rectifier assembly 1100 according to another embodiment. The rotating rectifier assembly 1100 generally includes a snap ring 1101, a cover 1102, an annular bus bar 1104, an insulator ring comprised of a three separate portions 1106a, 1106b, and 1106c (referred to in the assembled form as simply insulator ring 1106), and an outer housing 1108. The annular bus bar 1104 is assembled radially interior of the insulator ring 1106, which in turn is assembled radially interior of the outer housing 1108. The cover 1102 is assembled last and acts to retain, along with snap ring 1101, each of the previous assembled portions within the outer housing 1108. Similar to the embodiment shown in FIG. 8, the snap ring 1101 is used to retain the cover 802.

The cover 1102 includes a flange 1110 having an annular channel 1112 extending around an outer circumference of the flange for receiving the snap ring 1109, and a cylindrical portion 1114 that extends axially away from the flange 1110. In the embodiment shown in FIG. 11, the cover 1102 further includes a circumferential groove 1116 that extends around the inner annular diameter of the cover 1102, and one or more fluid passages 1117 extending radially outward though the cylindrical portion 1114 of the cover 1102. The fluid passage 1117 allows cooling fluid (e.g., oil) to be communicated from a shaft (not shown) radially outward through the cover 1102 to other portions of rotating rectifier assembly 1100.

As described with respect to FIG. 8, the annular channel 1112 is sized to receive the snap ring 1101, which is also discontinuous, for securing the cover 1102 to the outer housing 1108. The discontinuous portion of the snap ring 1101 is aligned with the discontinuous portion of the annular channel 1112. Once installed, the discontinuous portion of the annular channel 1112 prevents the snap ring 1101 from rotating within the cover 1102. The snap ring 1101 is installed once the cover 1102, the annular bus bar 1104, and the insulator ring 1106 have been fit within the outer housing 1108. The snap ring 1101 is placed into the annular channel 1112, and engages with a snap ring retention channel 1154 (described in more detail below with respect to the outer housing 1108), which is located around the inner circumference of the outer housing 1108.

In the view shown in FIG. 11, the annular bus bar 1104 is already installed within the inner diameter of the insulator ring 1106. As described in more detail with respect to FIGS. 12 and 13, the annular bus bar a plurality of axial groove pairs (not labeled) for retaining a plurality of springs 1124 (once again, only the nearest leaf spring is labeled).

A plurality of leaf springs 1124 (a total of six in the embodiment shown in FIG. 11) are positioned for installation within an outer diameter of the annular bus bar 1104. When installed, the plurality of leaf springs 1124 provide an electrical connection path between the annular bus bar 1104 and one of the plurality of diode pairs (e.g., diode pairs 1136 and 1138 visible in FIG. 11) or one of the plurality of resistors (e.g., resistor 1139 is visible in FIG. 11). In addition, the plurality of leaf springs 1124 provide a radially outward force against one of the plurality of diode pairs and/or plurality of resistors that encourages electrical contact between the radially outward portion of one of the plurality of diode pairs and/or plurality of resistors and the outer housing 1108.

The annular bus bar 1104 may once again be generally rigid and may be generally toroidal in shape, extending about a central axis 1111. The annular bus bar 1104 may have any thickness suitable to provide sufficient electrical current carrying capacity and/or structural integrity in rotating embodiments. In addition, in the embodiment shown in FIG. 11 the annular bus bar 1104 is unitary and is constructed of a conductive material such as copper.

Figure 13:
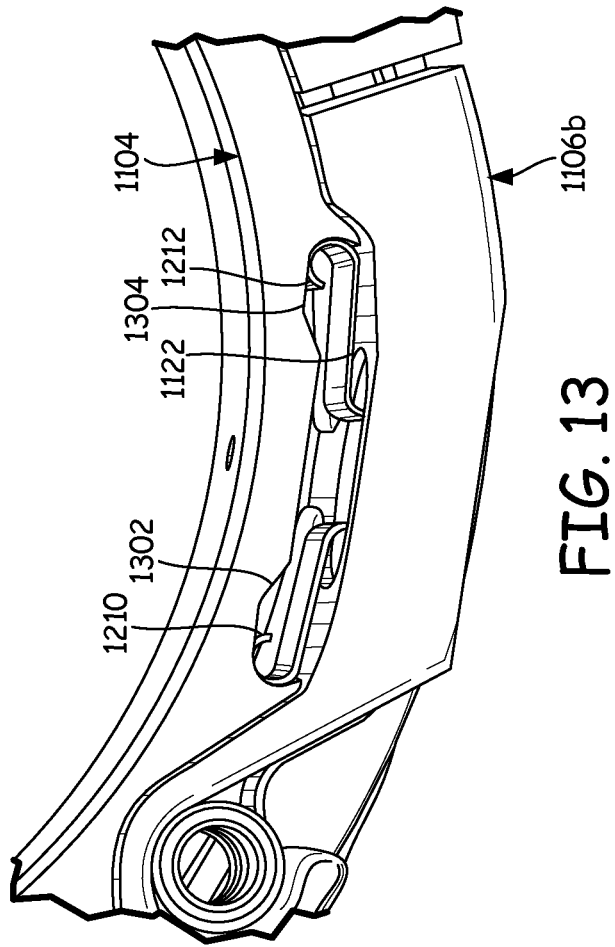
FIG. 13 illustrates an enlarged top view of a portion of the rotating rectifier assembly according to an embodiment.
Figure 12:
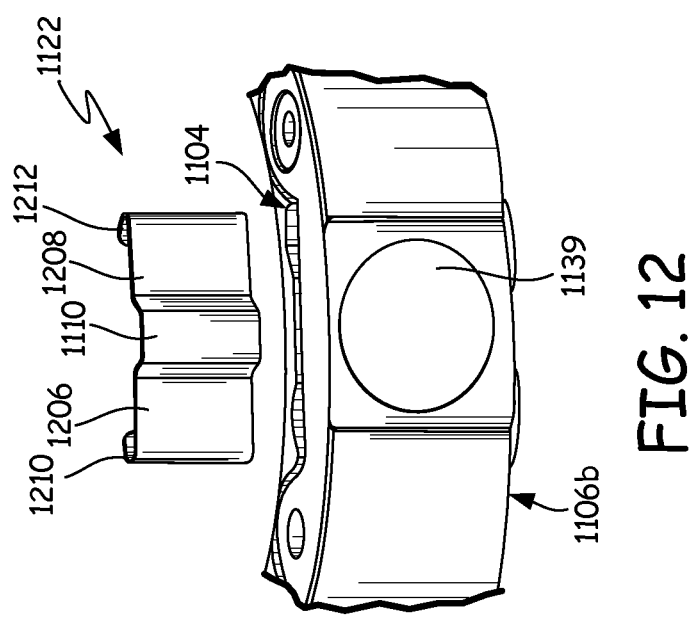
FIG. 12 illustrates a partial, exploded perspective view of a rotating rectifier assembly rectifier assembly according to another embodiment.

In the embodiment shown in FIG. 11, the insulator is comprised of a plurality (e.g., three) non-integral portions 1106a, 1106b, and 1106c. When placed adjacent to one another, the three non-integral portions 1106a, 1106b, and 1106c form a ring structure similar to the insulator ring 806 shown in FIG. 8. A benefit of this design, as discussed in more detail with respect to FIGS. 12 and 13, is that the non-integral portions 1106a, 1106b, and 1106c may be installed onto the annular bus bar 1104 from a radial direction (e.g., perpendicular to central axis 1111) and can be used to capture leaf springs 1124 in an axial direction (e.g., parallel to the central axis 1111).

For example, in one embodiment one or more of the leaf springs is installed within axial grooves located on the outer diameter of the annular bus bar 1104. The leaf springs are retained in a radial direction by the axial grooves, described in more detail with respect to FIGS. 12 and 13. Subsequently, one or more of the non-integral portions 1106a, 1106b, and/or 1106c are placed against the plurality of leaf springs 1124, thereby compressing the leaf springs 1124 and allowing the insulator ring 1106 to be placed within the outer housing 1108. In another embodiment, the annular bus bar 1104 and the non-integral portions 1106a, 1106b, and 1106c of the insulator ring are installed within the outer housing 1108. Subsequently, the leaf springs 1124 are inserted in an axial direction (i.e., parallel with central axis 1111) into the axial grooves of the annular bus bar 1104.

In the embodiment shown in FIG. 11, an AC input provided to the rotating rectifier assembly 1100 is provided via the one or more terminals 1143 (only the nearest terminal is clearly visible in this view), which communicates the AC input to one or the pairs of diodes 1136, 1137, or 1138 via the adjacent conductive tabs 1144. The combination of the combination of diode pairs (e.g., diode pairs 1136 and 1138) and one or more resistors (e.g., resistor 1139) act to rectify three-phase power; however, it will be appreciated that other numbers of diodes and resistors may be employed for other applications, without departing from the scope of the present disclosure. The pairs of diodes (e.g., diode pairs 1136 and 1138) and one or more resistors (e.g., resistor 1139) are electrically connected to one another via the annular bus bar 1104, which receives the rectified output provided by the pair of diodes 1136, 1137, and 1138.

As described above, the outer housing 1108 is positioned to receive and retain the insulator 1104. As described with respect to FIG. 8, the outer housing 1108 similarly includes an inner diameter 1146, and outer diameter 1148, one or more fluid outlet ports 1150 (two nearest ports are labeled), an alignment portion 1152, a snap ring retention channel 1154, and a flange portion 1156. As shown, the insulator ring 1106 is received into the outer housing 1108, such that, for example, the outer diameter 1134 of the insulator ring 1106 is adjacent to an inner diameter 1146 of the outer housing 1108 and is retained by a radially inwardly extending protrusion 1152. The outer diameter 1134 of the insulator ring 1106 may be shaped (e.g., by casting, milling, cutting, additive manufacturing, etc.) to conform to the inner diameter 1146 of the insulator ring 1106. The axially extending channel of the insulator ring 1106 engages within the axial protrusion 1152 (which extends radially inward) to provide proper alignment between the inner bus assembly 1104 and the insulator ring 1106 to prevent rotation of the components with respect to one another. The insulator ring 1106 rests against inwardly projecting flange 1156 at a distal end of the outer housing 1108.

The snap ring retention channel 1154 extends circumferentially around the inner diameter 1146 of the outer housing 1108, and is configured to receive the snap ring 1101 after the cover 1102, the inner bus assembly 1104, and the insulator ring 1106 have been installed within the outer housing 1108. The snap ring 1101 is positioned within the annular channel 1112, with the outer circumference of the snap ring 1101 being located into the snap ring retention channel 1154. In this way, the snap ring 1101 retains the plurality of components axially within the outer housing 1108.

FIG. 12 is an enlarged view, partially exploded, of one of the leaf-springs 1122 prior to installation between the inner bus assembly 1104 and the insulator ring portion 1106b. In contrast with the embodiment shown in FIGS. 8-10, the leaf-spring 1122 illustrated in FIG. 12 includes first and second flat portions extending away from center portion 1210. The leaf spring 1122 further includes first end portion 1210 and second end portion 1212, which are curved portions that are shaped to be received by and captured within inner bus assembly 1104. The first end portion 1210 and second end portion 1212 provide electrical contact with the inner bus assembly 1104, while the center portion 1210, which extends away from the inner bus assembly 1104, provides electrical contact with one of the diode pairs or resistors (in this case, the resistor 1139). In this way, the leaf spring 1122 provides the electrical connection between the inner bus assembly 1104 and the resistor 1139 when installed between the inner bus assembly 1104 and the insulator ring portion 1106b.

FIG. 13 is a top view of the leaf spring 1122 installed within the inner bus assembly 1104. In particular, the first end 1210 of the leaf spring 1122 is illustrated as fitting within the retaining wall 1302 of the inner bus assembly 1104, and the second end 1212 of the leaf spring 1122 is illustrated as fitting within the retaining wall 1304. The first and second ends 1210 and 1212 are shaped to conform with the shape of retaining walls 1302 and 1304, respectively. The center portion (not visible in this view) of the leaf spring 1122 is hidden under the insulator ring portion 1106b, which acts to retain the leaf spring 1122 in an axial direction. That is, it prevents the leaf spring 1122 from moving in a direction out of the page, thereby ensuring that the leaf spring 1122 remains in place during operation of the rotating rectifier assembly.

Figure 14:
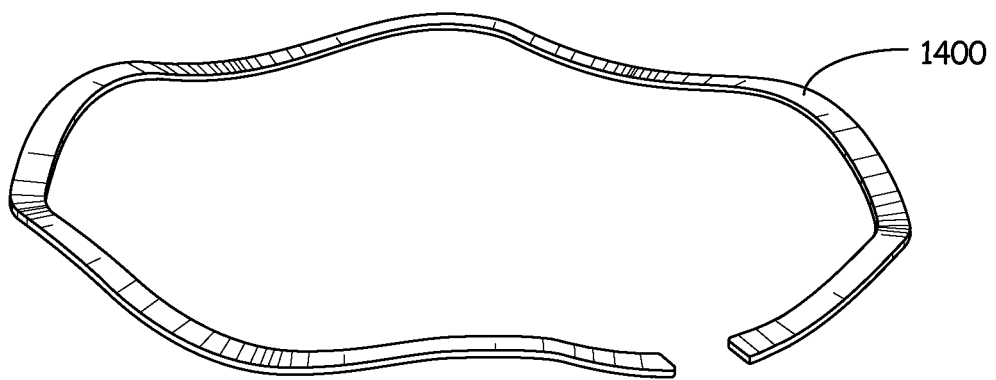
FIG. 14 illustrates a perspective view of a snap ring according to another embodiment of the present invention.

FIG. 14 is a perspective view of a snap ring 1400 that may be utilized in any of the embodiments described with respect to FIGS. 8-13. In the embodiment shown in FIG. 14, the snap ring includes a wave geometry in which the thickness of the snap ring 1400 remains constant, but oscillates up and down (e.g., in the shape of a sine wave) in an axial direction. The channel that receives the snap ring remains the same, but the wave geometry of the snap ring 1400 provides additional strength and resilience in retaining the rotating rectifier assembly.

While the present teachings have been illustrated with respect to one or more implementations, alterations and/or modifications may be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings.

It will be appreciated that structural components and/or processing stages may be added or existing structural components and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein.

The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side," "higher," "lower," "over," "top," and "under" are defined with respect to the conventional plane or working surface, regardless of the orientation of the workpiece.

The invention claimed is:

1. A rectifier assembly, comprising:
    a cover comprising a flange having an annular channel extending around an outer circumference of the flange;
    an annular bus bar comprising an electrically conductive material;
    an insulator ring receiving the annular bus bar, the insulator ring defining radially-extending resistor pockets and diode pockets therein;
    resistors disposed in the resistor pockets and electrically connected with the annular bus bar;
    diodes disposed in the diode pockets and electrically connected with the annular bus bar;
    an outer housing receiving the annular bus bar and the insulator ring, such that the insulator ring is positioned radially between the annular bus bar and the outer housing, the outer housing further comprising a snap ring retention channel that extends around an inner circumference of the outer housing; and
    a snap ring positioned within the annular channel of the outer circumference of the flange, wherein an outer circumference of the snap ring is located within the snap ring retention channel to retain the cover, the annular bus bar, and the insulator ring within the outer housing.

2. The rectifier assembly of claim 1, further comprising leaf springs disposed between and electrically connecting at least some of the resistors, at least some of the diodes, or both with the annular bus bar.

3. The rectifier assembly of claim 2, wherein the annular bus bar includes one or more pairs of axial grooves shaped to receive first and second ends of one of the leaf spring.

4. The rectifier assembly of claim 3, wherein the leaf spring includes a center portion, wherein the leaf spring is curved from the center portion to the first and second ends.

5. The rectifier assembly of claim 3, wherein the leaf spring includes a center portion, and first and second flat portions extending between the center portion and the first and second ends, respectively.

6. The rectifier assembly of claim 1, wherein the snap ring is substantially flat.

7. The rectifier assembly of claim 1, wherein the snap ring includes a sine wave geometry in an axial direction.

8. The rectifier assembly of claim 1, wherein the snap ring is discontinuous and is aligned with a discontinuous portion of the annular channel.

9. A method of manufacturing a rotating rectifier, comprising:
- inserting diodes and resistors radially inward into pockets extending at least partially radially through an insulator ring;
- receiving the insulator ring with the diodes and resistors inserted therein into an outer housing, wherein the outer housing includes a snap ring retention channel located around an inner circumference of the outer housing;
- receiving a annular bus bar comprising electrically conductive material into the insulator ring such that the insulator ring is radially intermediate the annular bus bar and the outer housing
- receiving a cover having a flange portion and a cylindrical portion into the monolithic annular bus bar, wherein the flange portion includes an annular channel that extends around an outer circumference of the flange; and
- receiving a snap ring into the annular channel of the cover, wherein an outer circumference of the snap ring is located within the snap ring retention channel on the outer housing to retain the cover, the annular bus bar, and the insulator ring within the outer housing.

10. The method of claim 9, further comprising electrically connecting the annular bus bar with at least some of the diodes and at least some of the resistors.

11. The method of claim 10, wherein electrically connecting the annular bus bar with the at least some of the diodes and the at least some of the resistors comprises inserting leaf springs between the annular bus bar and the insulator ring.

12. The method of claim 11, wherein electrically connecting the annular bus bar with the at least one of the diodes and the at least some of the resistors comprises inserting the leaf springs into axial grooves located on an outer circumference of the monolithic annular bus bar prior to inserting the monolithic annular bus bar into the insulator ring.

13. The method of claim 11, wherein electrically connecting the annular bus bar with the at least one of the diodes and the at least some of the resistors comprises inserting the leaf springs into axial grooves located on an outer circumference of the monolithic annular bus bar after the monolithic annular bus bar has been inserted into the insulator ring.

* * * * *